US008843255B2

(12) United States Patent
Wilson et al.

(10) Patent No.: US 8,843,255 B2
(45) Date of Patent: Sep. 23, 2014

(54) METHODS FOR DISPLAYING AIRCRAFT PROCEDURE INFORMATION

(71) Applicant: Honeywell International Inc., Morristown, NJ (US)

(72) Inventors: Blake Wilson, Peoria, AZ (US); Jary Engels, Peoria, AZ (US); Ivan Sandy Wyatt, Scottsdale, AZ (US); Roger W. Burgin, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/725,739

(22) Filed: Dec. 21, 2012

(65) Prior Publication Data

US 2014/0081485 A1     Mar. 20, 2014

Related U.S. Application Data

(62) Division of application No. 12/340,188, filed on Dec. 19, 2008, now Pat. No. 8,370,005.

(51) Int. Cl.
| | |
|---|---|
| G06F 19/00 | (2011.01) |
| G01S 13/00 | (2006.01) |
| G05D 1/12 | (2006.01) |
| G01C 21/00 | (2006.01) |
| G01C 23/00 | (2006.01) |
| G08G 5/00 | (2006.01) |
| G08G 5/02 | (2006.01) |

(52) U.S. Cl.
CPC ............ *G08G 5/0047* (2013.01); *G01C 23/005* (2013.01); *G08G 5/0021* (2013.01); *G08G 5/025* (2013.01)

USPC ................ 701/16; 342/33; 244/183; 340/972

(58) Field of Classification Search
USPC ........... 701/3, 4, 5, 6, 7, 8, 11, 12, 14, 15, 16, 701/17, 18, 468, 528, 529, 539; 244/3.19, 244/3.15, 17.17, 185, 186, 220, 90 R; 340/959, 967, 972, 979, 951; 342/18, 342/34, 35, 49, 58, 63, 83, 81, 84, 87, 157, 342/199, 357.53
See application file for complete search history.

(56) References Cited

U.S. PATENT DOCUMENTS 6,314,370 B1 * 11/2001 Curtright ...................... 701/412
6,466,235 B1   10/2002 Smith et al.
(Continued)

FOREIGN PATENT DOCUMENTS

EP    1091190 A2    4/2001
EP    1852683 A2    11/2007

OTHER PUBLICATIONS

EP Search Report, EP 09 177 956.1 dated Jan. 17, 2012.
(Continued)

*Primary Examiner* — Muhammad Shafi
(74) *Attorney, Agent, or Firm* — Ingrassia Fisher & Lorenz, P.C.

(57) ABSTRACT

Methods are provided for presenting procedure information for an airport on a display device onboard an aircraft. A method comprises displaying a map on a display device and displaying a briefing panel overlying a portion the map. The briefing panel includes a plurality of segments, wherein each segment is associated with a type of procedure information for the airport.

20 Claims, 7 Drawing Sheets

(56) References Cited

U.S. PATENT DOCUMENTS

| | | |
|---|---|---|
| 7,693,621 B1 * | 4/2010 | Chamas .......................... 701/16 |
| 2007/0168120 A1 | 7/2007 | Vandenbergh et al. |
| 2007/0260364 A1 * | 11/2007 | Dwyer ............................ 701/3 |
| 2008/0201029 A1 | 8/2008 | Brown et al. |
| 2009/0093953 A1 * | 4/2009 | Wiesemann et al. .......... 701/200 |
| 2009/0231164 A1 | 9/2009 | Burgin et al. |
| 2010/0148990 A1 | 6/2010 | Burgin et al. |

OTHER PUBLICATIONS

EP Examination Report, EP 09 177 956.1 dated Jan. 26, 2012.

* cited by examiner

METHODS FOR DISPLAYING AIRCRAFT PROCEDURE INFORMATION

CROSS-REFERENCE TO RELATED APPLICATIONS

This is a division of U.S. patent application Ser. No. 12/340,188, filed Dec. 19, 2008, now issued U.S. Pat. No. 8,370,005.

TECHNICAL FIELD

The subject matter described herein relates generally to avionics systems, and more particularly, embodiments of the subject matter relate to flight management systems and related cockpit displays adapted for displaying aircraft procedure information.

BACKGROUND

Instrument procedures (e.g., instrument approach procedures or instrument departure procedures) are used to allow pilots to operate an aircraft without assistance from air traffic control. For example, instrument approach procedures allow a pilot to reliably land an aircraft in situations of reduced visibility or inclement weather by using instruments onboard the aircraft or on the ground, such as radios or other communication systems, navigation systems, localizers, glidescopes, and the like. Published aeronautical charts, such as, for example, Instrument Approach Procedure (IAP) charts, Standard Terminal Arrival (STAR) charts, or Terminal Arrival Area (TAA) charts Standard Instrument Departure (SID) routes, Departure Procedures (DP), terminal procedures, approach plates, and the like, depict and describe the instrument procedures for various airports, runways, or other landing and/or departure locations are provided by a governmental or regulatory organization, such as, for example, the Federal Aviation Administration in the United States. These charts graphically illustrate and describe the specific procedures (e.g., minimum descent altitudes, minimum runway visual range, final course or heading, relevant radio frequencies, missed approach procedures) to be followed or otherwise utilized by a pilot for a particular approach or departure. A pilot maintains copies of these printed charts for the various possible airports that the pilot may encounter during operation of the aircraft. For example, for worldwide operation, there are as many as 17,000 charts, and each airport may include multiple runways with multiple possible approaches and departures.

Typically, in advance of the actual approach or departure, the pilot identifies the airport and reviews the charts for the one or more approaches (or departures) for that airport. Once the pilot determines the approach (or departure) that the pilot intends to fly, the pilot and crew (e.g., the co-pilot) review features of the instrument procedure such that there is sufficient understanding and agreement on how the procedure should be executed based on the chart. Generally, an instrument approach is one of the most critical periods during operation of an aircraft, for example, the pilot may be flying blind or with low visibility and the aircraft may be flying close to ground with the landing system deployed and limited maneuverability. Therefore, it is important that the pilot utilizes the proper information from the chart when executing the instrument approach procedure. However, the printed charts often include a variety of approach procedure information not relevant to the current approach or type of aircraft the pilot is currently operating. For example, the printed charts often include different instrument approach procedure information for different categories of aircraft, or for approaches using different instruments or equipment. If the pilot wants to consult the chart during the approach to ensure the pilot is following the proper procedure, the pilot must not only locate the appropriate chart, but also locate the proper information for the current approach within the chart. As a result, using and maintaining the printed charts can be cumbersome and inconvenient.

Because of the amount of information contained in the printed charts, it is difficult to display them electronically onboard the aircraft. For example, in current electronic cockpit displays, the resolution and physical size of the electronic display limits or prevents the instrument procedure charts to be reproduced or replicated electronically. Furthermore, most of the display area on the electronic display is already utilized or reserved for other processes (e.g., navigational maps, profile views, synthetic vision displays, flight management windows, and the like) and presenting the instrument procedure chart risks interfering with or obfuscating these other processes.

BRIEF SUMMARY

A method is provided for presenting procedure information for an airport on a display device associated with an aircraft. The method comprises displaying a map on the display device, and displaying a briefing panel overlying a portion the map. The briefing panel includes a plurality of segments, wherein each segment is associated with a type of procedure information for the airport.

In another embodiment, a method is provided for displaying an instrument procedure for an airport. The method comprises rendering a navigational map on a display device associated with an aircraft and rendering a plurality of menu segments overlying a portion the navigational map. Each menu segment is associated with a type of instrument procedure information for the landing location.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements.

DETAILED DESCRIPTION

The following detailed description is merely exemplary in nature and is not intended to limit the subject matter of the application and uses thereof. Furthermore, there is no intention to be bound by any theory presented in the preceding background or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

For the sake of brevity, conventional techniques related to graphics and image processing, navigation, flight planning, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate to display systems adapted for displaying, on a display device associated with an aircraft, procedure information overlying a navigational map or another process currently displayed on the display device. In an exemplary embodiment, instrument procedure information for an identified airport is displayed in a briefing panel or menu bar overlying the upper portion of the navigational map. The briefing panel comprises a plurality of selectable segments or pull-down menus, each being associated with a type of instrument procedure information. A user may select the various segments to display additional possible criterion for the type or category of instrument procedure information for the identified airport. The desired or relevant instrument procedure information may thereby be presented overlying the navigational map in a manner that does not degrade the situational awareness provided by the navigational map.

Figure 1:
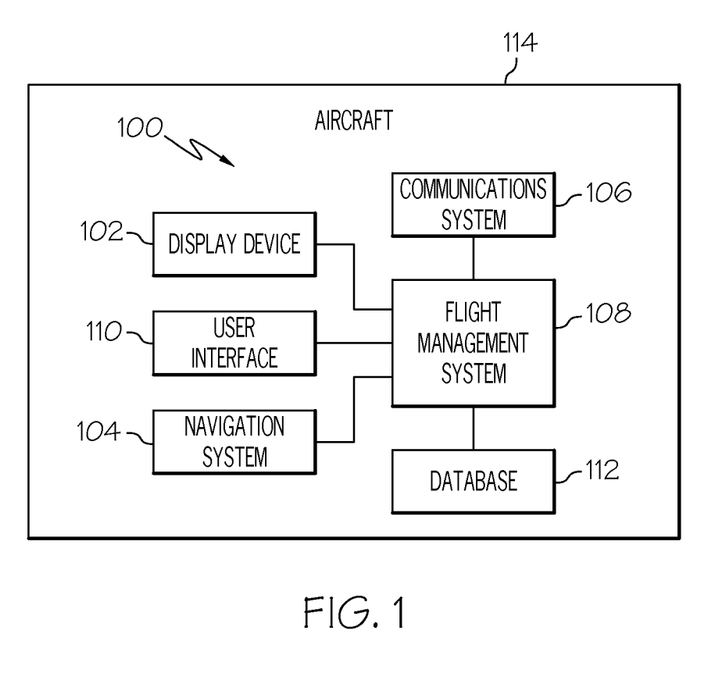
FIG. 1 is a block diagram of a display system suitable for use in an aircraft in accordance with one embodiment.

FIG. 1 depicts an exemplary embodiment of a display system 100, which may be located onboard an aircraft 114. This embodiment of display system 100 may include, without limitation, a display device 102, a navigation system 104, a communications system 106, and a flight management system 108 (FMS). The display system 100 further includes a user interface 110 for enabling interactivity with the display system 100 and a database 112 suitably configured to support operation of the display system 100, as described in greater detail below. It should be understood that FIG. 1 is a simplified representation of a display system 100 for purposes of explanation and ease of description, and FIG. 1 is not intended to limit the application or scope of the subject matter in any way. In practice, the display system 100 and/or aircraft 114 will include numerous other devices and components for providing additional functions and features, as will be appreciated in the art.

In an exemplary embodiment, the display device 102 is coupled to the flight management system 108, and the flight management system 108 is configured to display, render, or otherwise convey one or more graphical representations or images associated with operation of the aircraft 114 on the display device 102, as described in greater detail below. The flight management system 108 is coupled to the navigation system 104 for obtaining real-time data and/or information regarding operation of the aircraft 114 to support operation of the flight management system 108, as will be appreciated in the art. In an exemplary embodiment, the user interface 110 is coupled to the flight management system 108, and the user interface 110 and the flight management system 108 are configured to allow a user to interact with the display device 102 and other elements of display system 100, as described in greater detail below. The communications system 106 is coupled to the flight management system 108 and configured to support communications between the aircraft 114 and another aircraft or ground location (e.g., air traffic control), as will be appreciated in the art.

In an exemplary embodiment, the display device 102 is realized as an electronic display configured to graphically display flight information or other data associated with operation of the aircraft 114 under control of the flight management system 108, as will be understood. In an exemplary embodiment, the display device 102 is located within a cockpit of the aircraft 114. It will be appreciated that although FIG. 1 shows a single display device 102, in practice, additional display devices may be present onboard the aircraft 114. The user interface 110 may also be located within the cockpit of the aircraft 114 and adapted to allow a user (e.g., pilot, co-pilot, or crew member) to interact with the flight management system 108, as described in greater detail below. In various embodiments, the user interface 110 may be realized as a keypad, touchpad, keyboard, mouse, touchscreen, joystick, microphone, or another suitable device adapted to receive input from a user. In an exemplary embodiment, the user interface 110 and flight management system 108 are cooperatively configured to enable a user to indicate, select, or otherwise manipulate one or more pop-up menus displayed on the display device 102, as described below. It should be appreciated that although FIG. 1 shows the display device 102 and user interface 110 within the aircraft 114, in practice, either or both may be located outside the aircraft 114 (e.g., on the ground as part of an air traffic control center or another command center) and communicatively coupled to the flight management system 108.

In an exemplary embodiment, the navigation system 104 is configured to obtain one or more navigational parameters associated with operation of the aircraft 114. The navigation system 104 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 104, as will be appreciated in the art. In an exemplary embodiment, the navigation system 104 is capable of obtaining and/or determining the current location of the aircraft 114 (e.g., the latitude and longitude) and the heading of the aircraft 114 (i.e., the direction the aircraft is traveling in relative to some reference) and providing these navigational parameters to the flight management system 108.

In an exemplary embodiment, the communications system 106 is suitably configured to support communications between the aircraft 114 and another aircraft or ground location (e.g., air traffic control). In this regard, the communications system 106 may be realized using a radio communication system or another suitable data link system. In accordance with one embodiment, the communications system 106 includes at least one radio configured to be tuned for an identified radio communication frequency, as will be appreciated in the art and described in greater detail below.

In an exemplary embodiment, the flight management system 108 (or, alternatively, a flight management computer) is located onboard the aircraft 114. Although FIG. 1 is a simplified representation of display system 100, in practice, the flight management system 108 may be coupled to one or more additional modules or components as necessary to support navigation, flight planning, and other aircraft control functions in a conventional manner. In addition, the flight management system 108 may include or otherwise access a terrain database, navigational database, geopolitical database, or other information for rendering a navigational map or other content on the display device 102, as described below. In this regard, the navigational map may be based on one or more sectional charts, topographic maps, digital maps, or any other suitable commercial or military database or map, as will be appreciated in the art.

In an exemplary embodiment, the flight management system 108 accesses or includes a database 112 that contains procedure information for a plurality of airports. As used herein, procedure information should be understood as a set of operating parameters or instructions associated with a particular action (e.g., landing, take off, taxiing) that may be undertaken by the aircraft 114 at a particular airport. In this regard, an airport should be understood as referring to a location suitable for landing (or arrival) and/or takeoff (or departure) of an aircraft, such as, for example, airports, runways, landing strips, and other suitable landing and/or departure locations. The database 112 maintains the association of the procedure information and the corresponding airport. In an exemplary embodiment, the procedure information maintained in the database 112 comprises instrument procedure information conventionally displayed on a published chart (or approach plate) for the airport, as will be appreciated in the art. In this regard, the procedure information may comprise instrument approach procedures, standard terminal arrival routes, instrument departure procedures, standard instrument departure routes, obstacle departure procedures, or other suitable instrument procedure information. Although the subject matter is described below in the context of an instrument approach procedure for purposes of explanation, in practice, the subject matter is not intended to be limited to instrument approach procedure and may be implemented for instrument departure procedures and other procedures in a similar manner as described below.

In an exemplary embodiment, an airport has at least one approach having instrument approach procedure information associated therewith. In this regard, each airport (or landing location) may have one or more predefined approaches associated therewith. For example, an airport may comprise a plurality of possible approaches depending on the particular airport runway chosen for landing. In this regard, the database 112 maintains the association of the instrument approach procedure information and the corresponding approach for each airport or landing location. In a similar manner, an airport (or departure location) may at least one departure route having instrument departure procedure information associated therewith, as will be appreciated in the art. In an exemplary embodiment, the flight management system 108 is suitably configured to utilize the database 112 for rendering instrument approach procedure information for an identified approach (or instrument departure procedure information for an identified departure route), as described in greater detail below.

Figure 2:
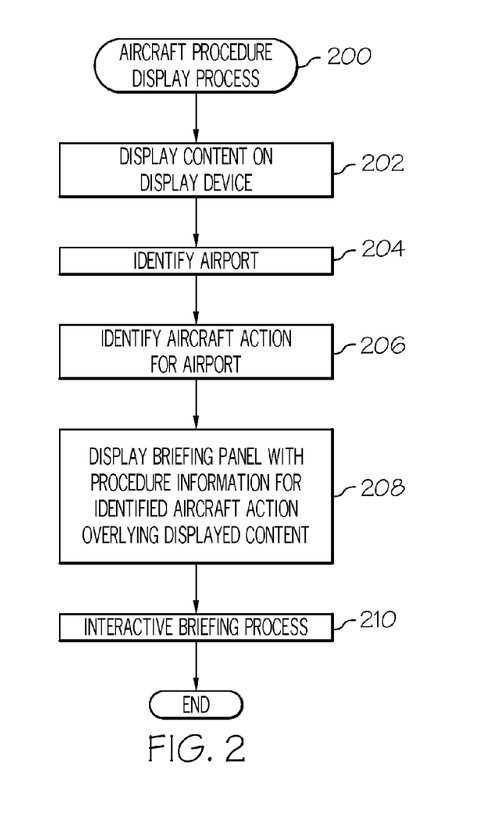
FIG. 2 is a flow diagram of an exemplary aircraft procedure display process suitable for use with the display system of FIG. 1 in accordance with one embodiment.

Referring now to FIG. 2, in an exemplary embodiment, a display system 100 may be configured to perform an aircraft procedure display process 200 and additional tasks, functions, and operations described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the display device 102, the navigation system 104, the communications system 106, the flight management system 108, the user interface 110, or the database 112. It should be appreciated that any number of additional or alternative tasks may be included, and may be incorporated into a more comprehensive procedure or process having additional functionality not described in detail herein.

Referring again to FIG. 2, and with continued reference to FIG. 1, an aircraft procedure display process 200 may be performed to display or present aircraft procedure information (e.g., an instrument approach procedure or instrument departure procedure) for a desired action (e.g., landing or takeoff) at an airport on a display device in order to enable a user, such as a pilot or crew member, to review and/or brief the procedure without reliance on paper charts. It should be appreciated that although the aircraft procedure display process 200 is described in the context of an approach (or instrument approach procedure) for purposes of explanation, the aircraft procedure display process 200 may be implemented for instrument departure procedures and other procedures in a similar manner as described herein.

In an exemplary embodiment, the aircraft procedure display process 200 initializes by displaying content on a display device associated with an aircraft (task 202). In an exemplary embodiment, the aircraft procedure display process 200 displays a navigational map (or terrain map) on the display device. For example, referring now to FIG. 3, and with continued reference to FIG. 1 and FIG. 2, the aircraft procedure display process 200 may display and/or render a navigational map 300 associated with a current (or instantaneous) location of an aircraft on a display device in the aircraft. In this regard, the flight management system 108 may be configured to control the rendering of the navigational map 300, which may be graphically displayed on the display device 102. The flight management system may also be configured to render a graphical representation of the aircraft 302 on the map 300, which may be overlaid or rendered on top of a background 304. The background 304 may be a graphical representation of the terrain, topology, or other suitable items or points of interest corresponding to (or within a given distance of) a location of the aircraft 114, which may be maintained by the flight management system 108 in a terrain database, a navigational database, a geopolitical database, or another suitable database. As described in greater detail below, the flight management system 108 may also render a graphical representation of an airport 306 overlying the background 304. It should be appreciated that although the subject matter may be described herein in the context of a navigational map, the subject matter is not intended to be limited to a particular type of content displayed on the display device and the aircraft procedure display process 200 may be implemented with other types of content, such as, for example, an airport map or terminal map.

Figure 3:
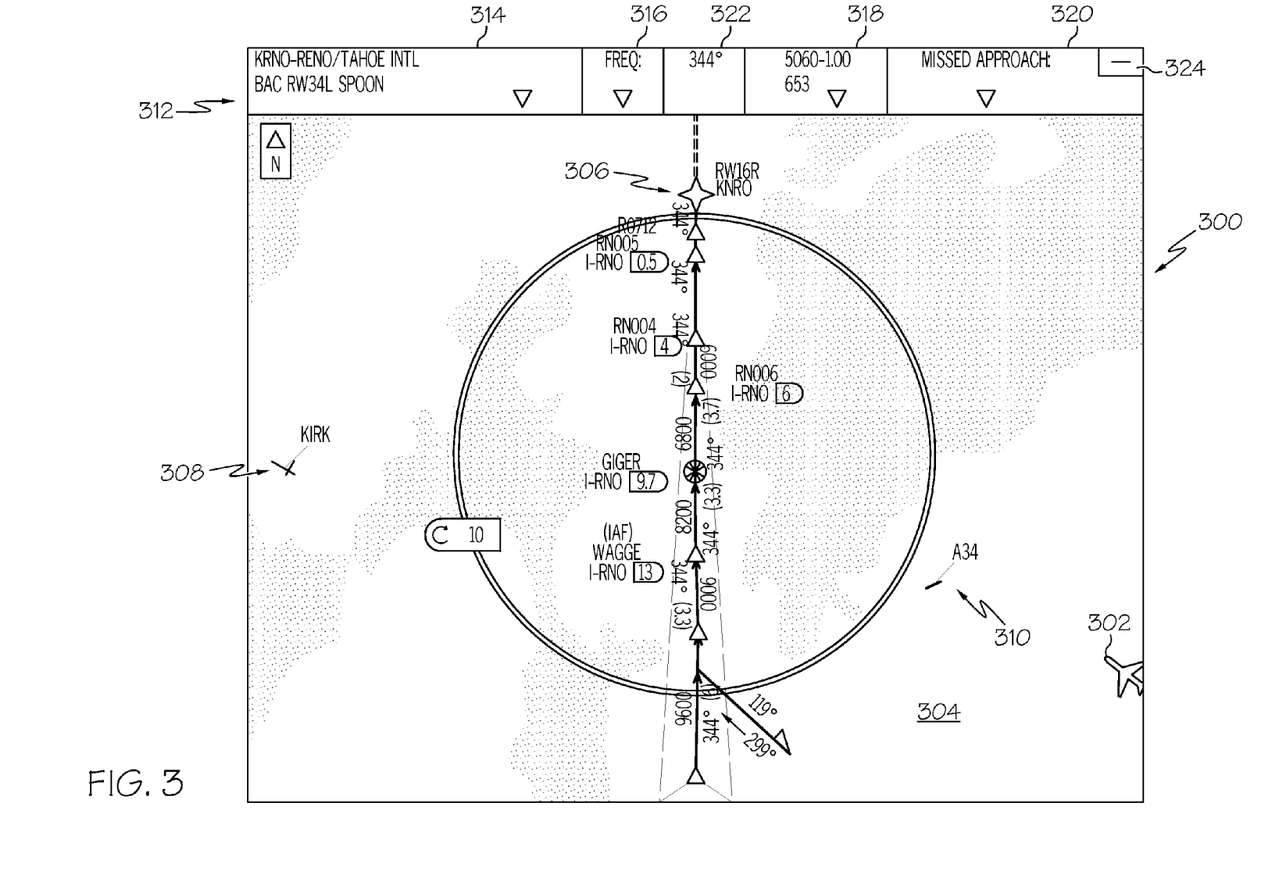
FIG. 3 is a schematic view of an exemplary navigational map suitable for use with the aircraft procedure display process of FIG. 2, showing a briefing panel overlying an upper portion of the navigational map in accordance with one embodiment.

Although FIG. 3 depicts a top view (e.g., from above the aircraft 302) of the navigational map 300, in practice, alternative embodiments may utilize various perspective views, such as side views, three-dimensional views (e.g., a three-dimensional synthetic vision display), angular or skewed views, and the like. Further, depending on the embodiment, the aircraft 302 may be shown as traveling across the map 300, or alternatively, as being located at a fixed position on the map 300, and FIG. 3 is not intended to limit the scope of the subject matter in any way. In an exemplary embodiment, the map 300 is associated with the movement of the aircraft, and the background 304 refreshes or updates as the aircraft travels, such that the graphical representation of the aircraft 302 is positioned over the terrain background 204 in a manner that accurately reflects the current (e.g., instantaneous or substantially real-time) real-world positioning of the aircraft 114 relative to the earth. In accordance with one embodiment, the map 300 is updated or refreshed such that it is centered on and/or aligned with the aircraft 302. Although the navigational map 300 shown in FIG. 2 is oriented north-up (i.e., moving upward on the map 300 corresponds to traveling northward), as described below, in other embodiments, the navigational map 300 may be oriented track-up or heading-up, i.e., aligned such that the aircraft 302 is always traveling in an upward direction and the background 304 adjusted accordingly.

In an exemplary embodiment, the aircraft procedure display process 200 continues by identifying a desired airport (e.g., a landing and/or departure location) for the aircraft (task 204). In this regard, an airport may comprise a runway, a landing strip, an airstrip, another suitable landing and/or departure location, and various combinations thereof having procedure information (e.g., instrument approach procedures or instrument departure procedures) associated therewith. In accordance with one embodiment, the aircraft procedure display process 200 may identify the desired airport using the navigational map 300 displayed on the display device 102. For example, as shown in FIG. 3, the aircraft procedure display process 200 may display a plurality of airports 306, 308, 310 proximate the aircraft 114 overlying the background 304 on the navigational map 300, as will be appreciated in the art.

The aircraft procedure display process 200 may identify the desired airport in response to a user selecting or indicating an airport displayed on the display device. For example, a user may manipulate the user interface 110 and indicate or otherwise select a first airport 306 (e.g., airport KRNO) displayed on the map 300 as the desired airport (e.g., by positioning a cursor or pointer over airport 306 and clicking or otherwise selecting airport 306). In another embodiment, the aircraft procedure display process 200 may identify the desired airport using a predetermined (or predefined) flight plan. For example, the flight management system 108 may maintain a flight plan that specifies airport 306 as the final entry (or destination) of the flight plan.

In an exemplary embodiment, the aircraft procedure display process 200 continues by identifying a desired aircraft action having associated procedure information for the identified airport (task 206). In this regard, an aircraft action should be understood as referring to an approach (or landing), a departure (or takeoff), taxiing, or another aircraft action having procedure information associated with the particular action. In accordance with one embodiment, the aircraft procedure display process 200 continues by identifying a desired approach for the identified airport. As used herein, an approach should be understood as referring to a predefined flight path or other guidance intended to facilitate a safe landing for an aircraft at a particular runway, landing strip, airstrip, or another suitable landing location. If the identified airport has only a single approach associated therewith (e.g., the airport is an airstrip or comprises a single runway), the aircraft procedure display process 200 may identify that approach as the desired approach. In accordance with one embodiment, if the identified aircraft has a plurality of possible approaches (e.g., the airport comprises a plurality of runways), the aircraft procedure display process 200 may identify or otherwise determine a default approach for use as a desired approach for the airport. For example, the aircraft procedure display process 200 may identify the most commonly used approach for the identified airport 306 as the default approach. Alternatively, the aircraft procedure display process 200 may identify the most recently used approach as the desired approach. In another embodiment, the aircraft procedure display process 200 determines and/or identifies the desired approach based on the current heading and/or location of the aircraft 114. For example, the aircraft procedure display process 200 may identify the approach with a final approach course most closely aligned with the current heading of the aircraft 114 as the desired approach. In yet another embodiment, the aircraft procedure display process 200 may identify or otherwise determine the desired approach using an interactive briefing process, as described in greater detail below with reference to FIG. 4.

In an exemplary embodiment, the aircraft procedure display process 200 continues by displaying (or rendering) a briefing panel comprising instrument procedure information for the identified (or desired) aircraft action overlying the content displayed on the display device (task 208). For example, as shown in FIG. 3, the briefing panel 312 may be rendered and/or displayed overlying the top (or upper) portion of the navigational map 300. The briefing panel 312 comprises a plurality of selectable (or interactive) segments 314, 316, 318, 320 associated with a particular type or category of instrument approach procedure information (e.g., the identification of the approach, the radio frequency, minima information, missed approach instructions), as described in greater detail below. It should be appreciated that in other embodiments, the briefing panel 312 may be rendered and/or displayed overlying a side portion or bottom (or lower)

portion of the displayed content (e.g., navigational map 300), and the subject matter is described herein in the context of a briefing panel 312 overlying the top portion of the displayed content for purposes of explanation.

In an exemplary embodiment, the briefing panel 312 is realized as a menu bar comprising a plurality of menu segments 314, 316, 318. In the illustrated embodiment where the briefing panel 312 overlies the top portion of the map 300, the menu segments 314, 316, 318 are realized as pull-down menu segments. Each pull-down menu segment 314, 316, 318 is associated with values or criteria for the identified approach for the type or category of instrument approach procedure information associated with the pull-down menu segment 314, 316, 318. For example, a first pull-down menu segment 314 may be associated with the approach identification and identify and/or display the name of the identified approach for the identified airport 306. A second pull-down menu segment 316 may be associated with possible radio frequencies (e.g., for the navigation system 104 or communications system 106) that may be utilized when executing the identified approach. A third pull-down menu segment 318 may be associated with the minima criteria (or minimums) (e.g., the minimum altitude, the minimum runway visual range (RVR)) for the identified approach. As described in greater detail below, the segments 314, 316, 318 may contain and/or display identified (or selected) values or criteria for the associated type of instrument approach procedure information in the briefing panel 312. That is, each respective segment 314, 316, 318 may display or otherwise contain information relating to one or more values or other criteria associated with a type or category of instrument approach procedure information associated with the respective segment 314, 316, 318. As shown, the briefing panel 312 may also include a selectable segment 320 associated with missed approach instructions for the identified approach. In an exemplary embodiment, the briefing panel 312 also includes a region 322 that is not selectable and displays static or non-configurable information for the identified approach. For example, as shown in FIG. 3, the region 322 may display the heading or final approach course and the minimum descent altitude for the identified approach.

In accordance with one embodiment, the aircraft procedure display process 200 is configured to automatically populate the segments on the briefing panel 312 with instrument approach procedure information that is most relevant or pertinent to the current operating state or current operating characteristics of the aircraft 114. For example, the flight management system 108 may identify and/or determine the category of the aircraft 114 (e.g., category A, B, C, D or E), and automatically display the minima information for the appropriate category in the minima segment 318. In another embodiment, the aircraft procedure display process 200 and/ or flight management system 108 may determine if a component of the instrument landing system (ILS) is not functioning, and in response, display instrument approach procedure information for a functioning component. For example, the flight management system 108 may determine that the glidescope is not functioning properly, and in response, display minima information for the localizer rather than the glidescope. In another embodiment, the aircraft procedure display process 200 and/or flight management system 108 may identify or determine the most frequently used radio frequency and display the identified radio frequency on the briefing panel 312 in the radio frequency segment 316. As described in greater detail below, in accordance with one embodiment, the aircraft procedure display process 200 may also configured to tune the appropriate radio onboard the aircraft 114 (e.g., a navigation radio or communications radio) to the identified radio frequency.

In an exemplary embodiment, the aircraft procedure display process 200 continues by performing an interactive briefing process while the briefing panel is displayed on the display device (task 210), as described in greater detail below with reference to FIG. 4. In an exemplary embodiment, the aircraft procedure display process 200 displays and/or renders a button or segment 324 in the briefing panel 312 in order to allow a user to exit the aircraft procedure display process 200 and remove the briefing panel 312 from the display. A user may manipulate the user interface 110 and indicate or otherwise select the button 324, for example, by positioning a cursor or pointer over the button 324 and clicking or otherwise selecting or identifying the button 324 in a conventional manner. In response to identifying selection of button 324, the aircraft procedure display process 200 may exit by removing the briefing panel 312 from the navigational map 300 such that the upper portion of the map 300 is no longer obscured by the briefing panel 312 after the instrument approach procedure information has been briefed by the pilot and/or crew.

Figure 4:
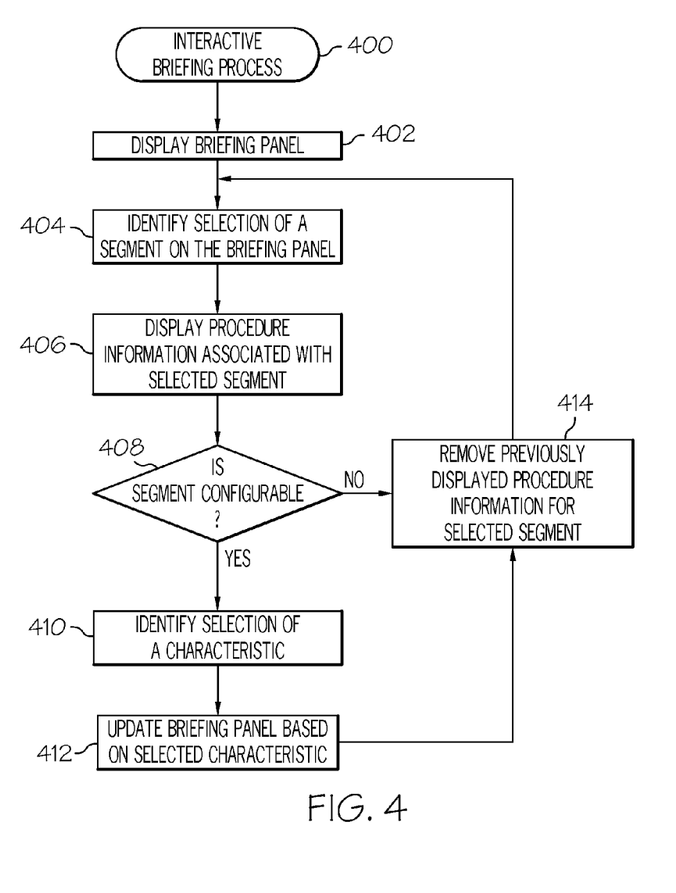
FIG. 4 is a flow diagram of an exemplary interactive briefing process suitable for use with the display system of FIG. 1 in accordance with one embodiment

Referring now to FIG. 4, in an exemplary embodiment, a display system 100 may be configured to perform an interactive briefing process 400 and additional tasks, functions, and operations described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the display device 102, the navigation system 104, the communications system 106, the flight management system 108, the user interface 110, or the database 112. It should be appreciated that any number of additional or alternative tasks may be included, and may be incorporated into a more comprehensive procedure or process having additional functionality not described in detail herein.

Referring again to FIG. 4, and with continued reference to FIG. 1, an interactive briefing process 400 may be performed to display or present the various possible values or criteria for the different types or categories of the procedure information while obstructing a minimal amount of the viewing area on a display device. In addition, the interactive briefing process 400 may also enable a user to review instrument approach (or departure) procedures for multiple possible approaches (or departures) for an identified airport without having to consult numerous paper charts. It should be appreciated that although the interactive briefing process 400 is described in the context of an approach (or instrument approach procedure) for purposes of consistency and ease of explanation, the interactive briefing process 400 may be implemented for instrument departure procedures and other procedures in a similar manner as described herein.

In an exemplary embodiment, the interactive briefing process 400 initializes by displaying a briefing panel overlying a navigational map (or other content) on a display device associated with an aircraft, as described above in the context of aircraft procedure display process 200 of FIG. 2 (task 402). For example, referring now to FIG. 5, the flight management system 108 may display and/or render a briefing panel 512 overlying navigational map 500 associated with a current (or instantaneous) location of the aircraft 114 on the display device 102. The flight management system 108 also be configured to render a graphical representation of the aircraft 502 along with an identified airport 506 which are be overlaid or rendered on top of a background 504, as described above.

Referring again to FIG. 4, in an exemplary embodiment, the interactive briefing process 400 continues by identifying selection of a first segment of the plurality of segments that are contained within or otherwise comprise the briefing panel (task 404). In this regard, a user may manipulate the user interface 110 to select or otherwise identify the first segment of the plurality of segments displayed in the briefing panel 512 in a conventional manner, for example, by positioning a cursor (or pointer) over desired segment and clicking or otherwise selecting the segment that the cursor (or pointer) overlies. In this regard, the flight management system 108 and/or interactive briefing process 400 may receive a command or signal indicative of the selection made by the user. In another embodiment, if the display system 100 is adapted for voice recognition, a user may select or otherwise identify a segment of the plurality of segments by speaking the name of the type or category of approach procedure information associated with the desired segment, for example, by saying "FREQUENCY" or "MINIMA," and in response, the interactive briefing process 400 identifies selection of the segment that matches or otherwise corresponds to the user input.

Figure 5:
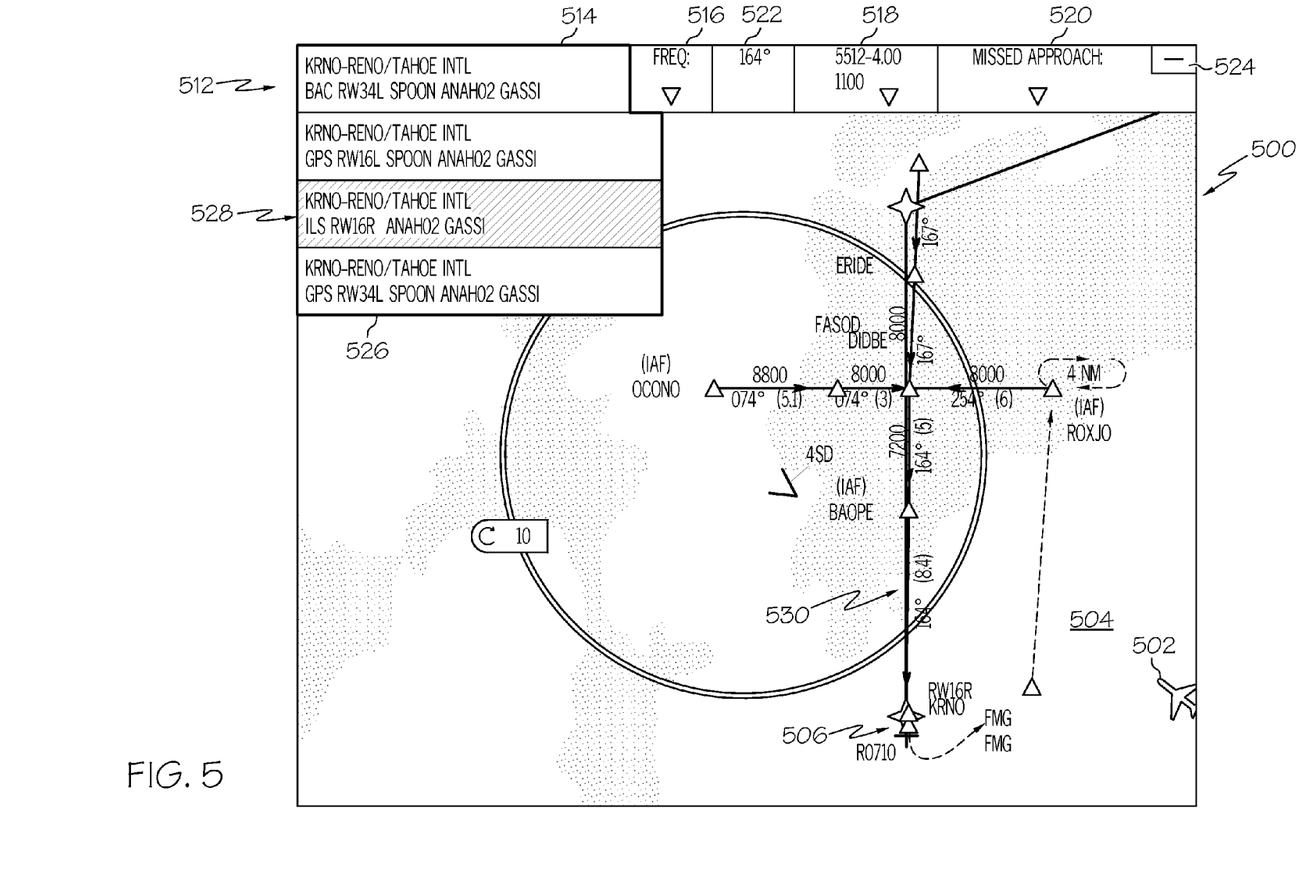
FIG. 5 is a schematic view of an exemplary navigational map suitable for use with the interactive briefing process of FIG. 4, showing identification of a desired approach using a pull-down menu overlying a portion of the navigational map in accordance with one embodiment.

In response to identifying selection of a segment within the briefing panel, the interactive briefing process 400 continues by displaying the possible values or criteria for the type or category of instrument procedure information associated with the selected segment (task 406). In an exemplary embodiment, the interactive briefing process 400 displays the possible values or criteria for the type or category of instrument approach procedure information using a pull-down menu. For example, as shown in FIG. 5, a user may identify or select the first segment 514 which corresponds to the identified approach for the airport 506. In response, the interactive briefing process 400 may render and/or display a pull-down menu 526 including approach procedure information comprising a plurality of possible approaches for the identified airport 506. As shown, the briefing panel 512 is overlying the upper or top portion of the navigational map 500 and the first segment 514 is realized as a pull-down menu segment configured such that the pull-down menu 526 overlies the navigational map 500 and the plurality of possible approaches are displayed overlying the background 504 of the map 500.

If the identified segment is a configurable segment, the interactive briefing process 400 continues by identifying selection of a desired approach characteristic, that is, a desired value or criteria for the type or category of approach procedure information associated with the identified segment (tasks 408, 410). In this regard, a configurable segment should be understood as referring to a selectable segment, such as a pull-down menu, that is adapted to allow a user to select or otherwise identify desired values or criteria for the type or category of approach procedure information associated with the segment. In accordance with one embodiment, the interactive briefing process 400 may identify selection of the desired approach characteristic in response to a user manipulating a cursor or pointer to select the desired approach characteristic from the pull-down menu 526. For example, as shown in FIG. 5, a user may select or identify approach 528 as the desired approach by positioning a cursor over the approach 528 and indicating a desire to select the approach from the pull-down menu 526 (e.g., by depressing a button on the user interface 110). In another embodiment, if the display system 100 is adapted for voice recognition, the interactive briefing process 400 may identify selection of the desired approach characteristic in response to a user orally selecting or identifying the desired approach characteristic. For example, referring to FIG. 5, the user may select the desired approach 528 by speaking the name of the approach, for example, by saying "ILS RUNWAY 16R," and in response, the interactive briefing process 400 identifies selection of the approach 528 that matches or otherwise corresponds to the user input. In an exemplary embodiment, the interactive briefing process 400 indicates or highlights the selected or identified approach 528, for example, by rendering or displaying the identified approach 528 using a visually distinguishable characteristic relative to the other entries in the pull-down menu 526, such as, for example, a visually distinguishable color, hue, tint, brightness, graphically depicted texture or pattern, contrast, transparency, opacity, animation (e.g., strobing, flickering or flashing), and/or other graphical effects. In this regard, the interactive briefing process 400 may be adapted to allow a user to confirm the identified selection after indicating the identified approach 528, for example, by prompting a user to select a button or another user interface element (e.g., a button that for "OK" or "APPLY") or otherwise allowing a user to orally confirm the selection.

In response to identifying selection of a desired approach characteristic, the interactive briefing process 400 continues by updating the briefing panel based on the selected approach characteristic (task 412). For example, as shown in FIG. 5, in response to the interactive briefing process 400 identifying approach 528 as the desired approach (e.g., by a user selecting approach 528 from the pull-down menu 526), the interactive briefing process 400 updates the briefing panel 512 to display or include instrument approach procedure information pertaining to the identified approach 528. The interactive briefing process 400 may update the approach procedure information displayed in the other segments 516, 518, 520, 522 of the briefing panel 512 to correspond to the newly identified approach, in a similar manner as described above in the context of FIG. 2 (e.g., task 208). That is, the briefing panel 512 is updated such that the pull-down menus 516, 518 and other segments 520, 522 display or otherwise include instrument approach procedure information relating to the most recently identified approach 528, rather than a previously identified approach. In accordance with one embodiment, the interactive briefing process 400 also updates the navigational map 500 by rendering and/or displaying a graphical representation 530 of the identified approach 528 overlying the background 504 on the navigational map 500 in response to identifying the approach 528. The interactive briefing process 400 may also be configured to update other processes or components of the display system 100 based on the selected approach characteristic. For example, if a user selects an approach 528 that has been previously briefed or executed, the interactive briefing process 400 may load or otherwise provide the approach 528 to a departure/arrival process or otherwise allow a flight plan for the approach 528 to be subsequently loaded or executed by the flight management system 108, as will be appreciated in the art.

After identifying the approach characteristic and updating the briefing panel, the interactive briefing process 400 continues by removing the displayed approach procedure information for the selected segment (task 414). For example, the interactive briefing process 400 may remove the pull-down menu 526 in response to a user selecting an approach from the list of possible approaches. Alternatively, the interactive briefing process 400 may remove the displayed approach procedure information in response to a user moving and/or positioning a cursor or pointer outside of the area occupied by the displayed information (e.g., outside of the area occupied by pull-down menu 526), as will be appreciated in the art. The loop defined by tasks 404, 406, 408, 410, 412, and 414 may repeat as desired while the briefing panel is displayed on the display device. For example, a user may select the pull-down menu segment 514 to identify another approach (e.g., a second approach) of the plurality of possible approaches. In response, the interactive briefing process 400 updates the briefing panel 512 to display instrument approach procedure information for the newly identified approach, rather than the previously identified approach. In this manner, a user may brief (or review) a plurality of possible approaches for an identified landing location without having to consult multiple paper charts.

Figure 6:
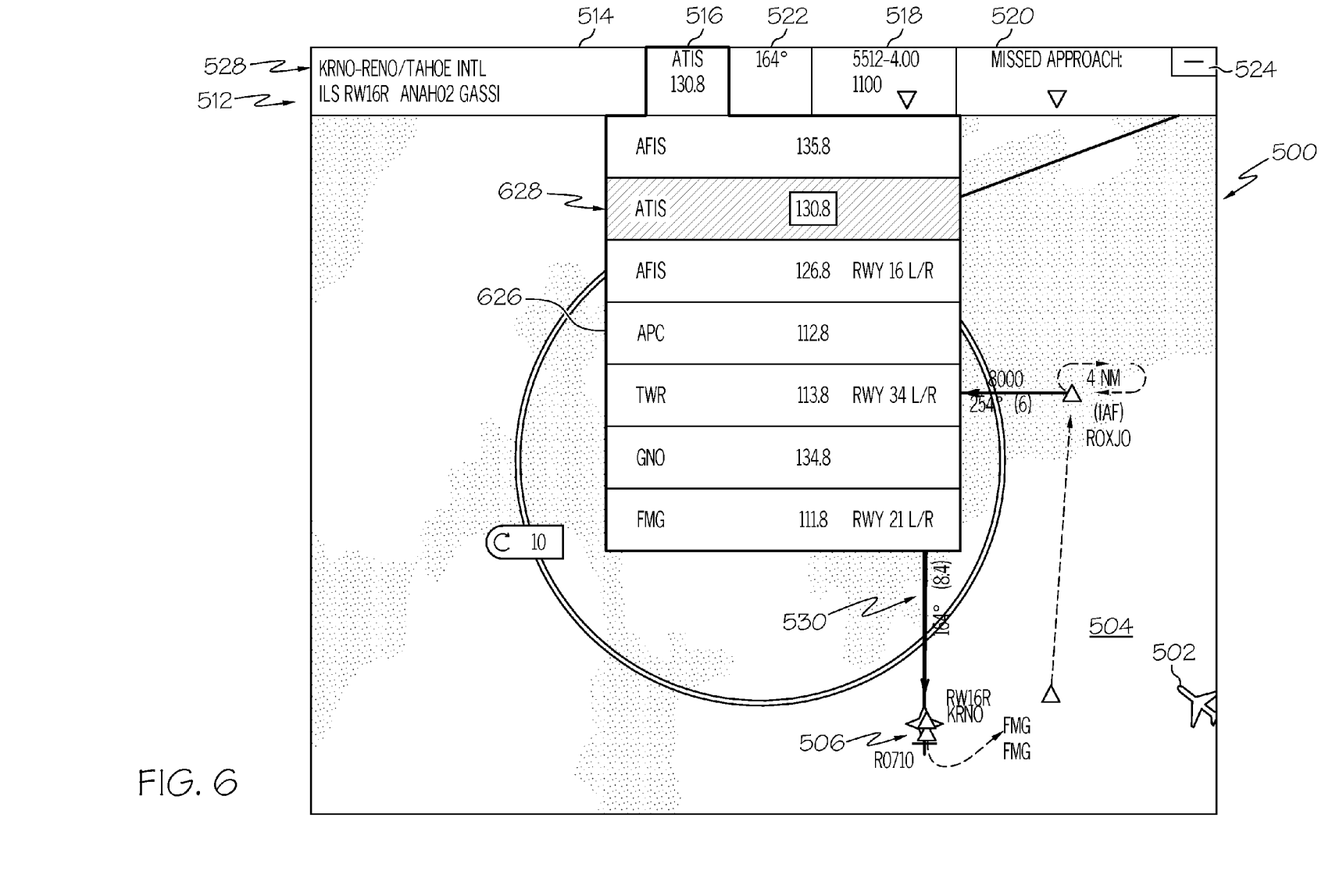
FIG. 6 is a schematic view of an exemplary navigational map suitable for use with the interactive briefing process of FIG. 4, showing identification of a desired radio frequency using a pull-down menu overlying a portion of the navigational map in accordance with one embodiment.

In an exemplary embodiment, the interactive briefing process 400 may also be utilized to review possible values or criteria for the different types or categories of instrument procedure information. In accordance with one embodiment, the interactive briefing process 400 is utilized to review the radio frequencies associated with the identified approach. As shown in FIG. 6, a user may manipulate the user interface 110 to identify the radio frequency segment 516 displayed in the briefing panel 512 in a similar manner as described above. In response, the interactive briefing process 400 displays a pull-down menu 626 including a plurality of possible radio frequencies (e.g., frequencies for the flight information service (AFIS), terminal information service (ATIS), ground control (GND)) for the identified approach 528. As shown, the pull-down menu 626 overlies the navigational map 500, such that the plurality of possible radio frequencies are displayed overlying the background 504 of the map 500 as described above. A user may select or identify a first frequency 628 of the list of radio frequencies in the pull-down menu 626, for example, the ATIS frequency, and in response, the interactive briefing process 400 may update the briefing panel 512 to display the identified radio frequency 628 in the segment 516 of the briefing panel 512 that corresponds to the radio frequency. In accordance with one embodiment, in response to identifying the ATIS radio frequency 628 from the plurality of possible radio frequencies, the interactive briefing process 400 may automatically tune a radio (e.g., that is part of the navigation system 104 or communications system 106) onboard the aircraft 114 to the identified radio frequency 628. The interactive briefing process 400 may indicate that the identified radio frequency 628 has been tuned, for example, by rendering or displaying the radio frequency 628 using a visually distinguishable characteristic relative to the other entries in the pull-down menu 626, as described above. In this manner, the likelihood of error or delay inherent with manually tuning the radio may be reduced or eliminated.

Figure 7:
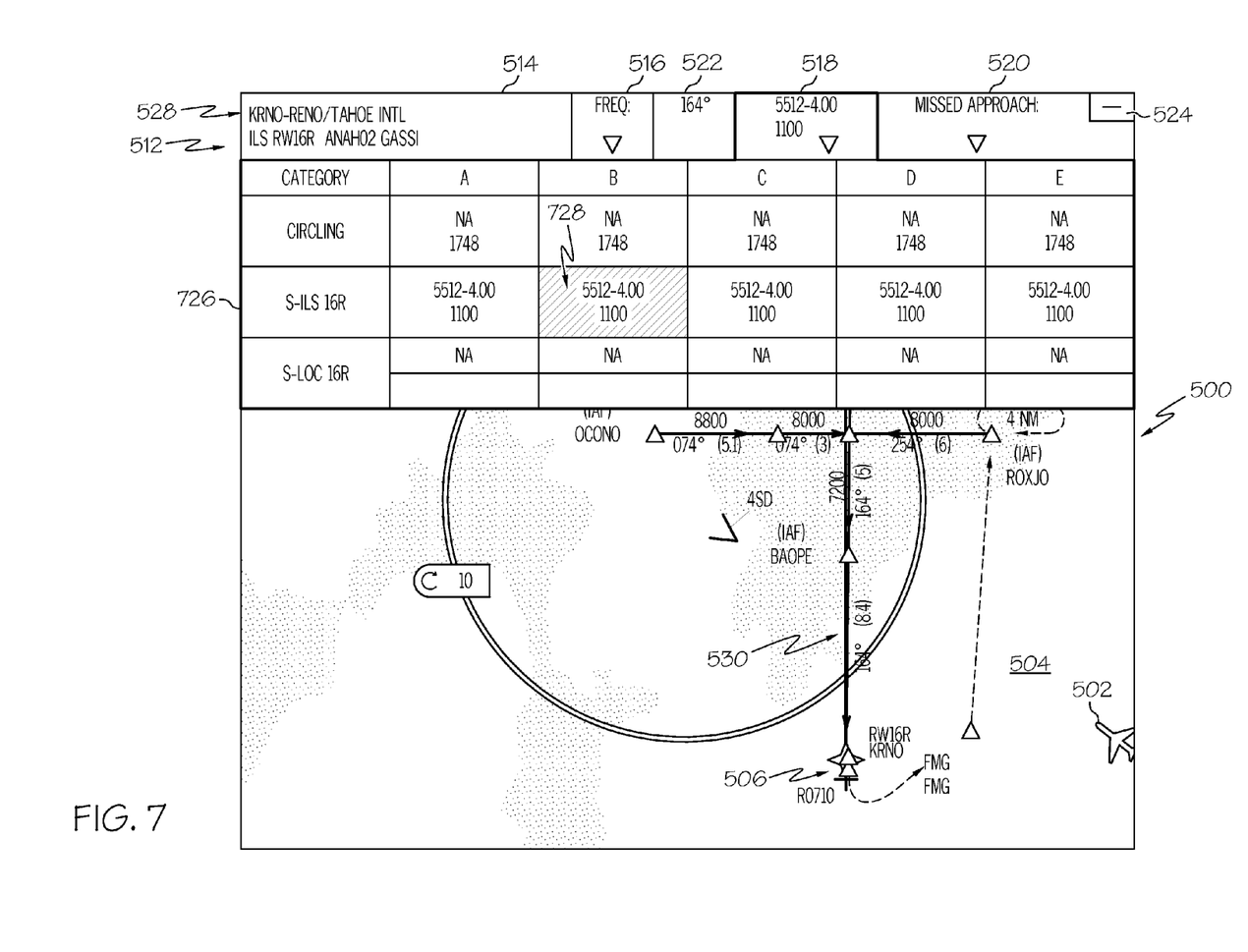
FIG. 7 is a schematic view of an exemplary navigational map suitable for use with the interactive briefing process of FIG. 4, showing identification of a desired minima criteria using a pull-down menu overlying a portion of the navigational map in accordance with one embodiment.
Figure 8:
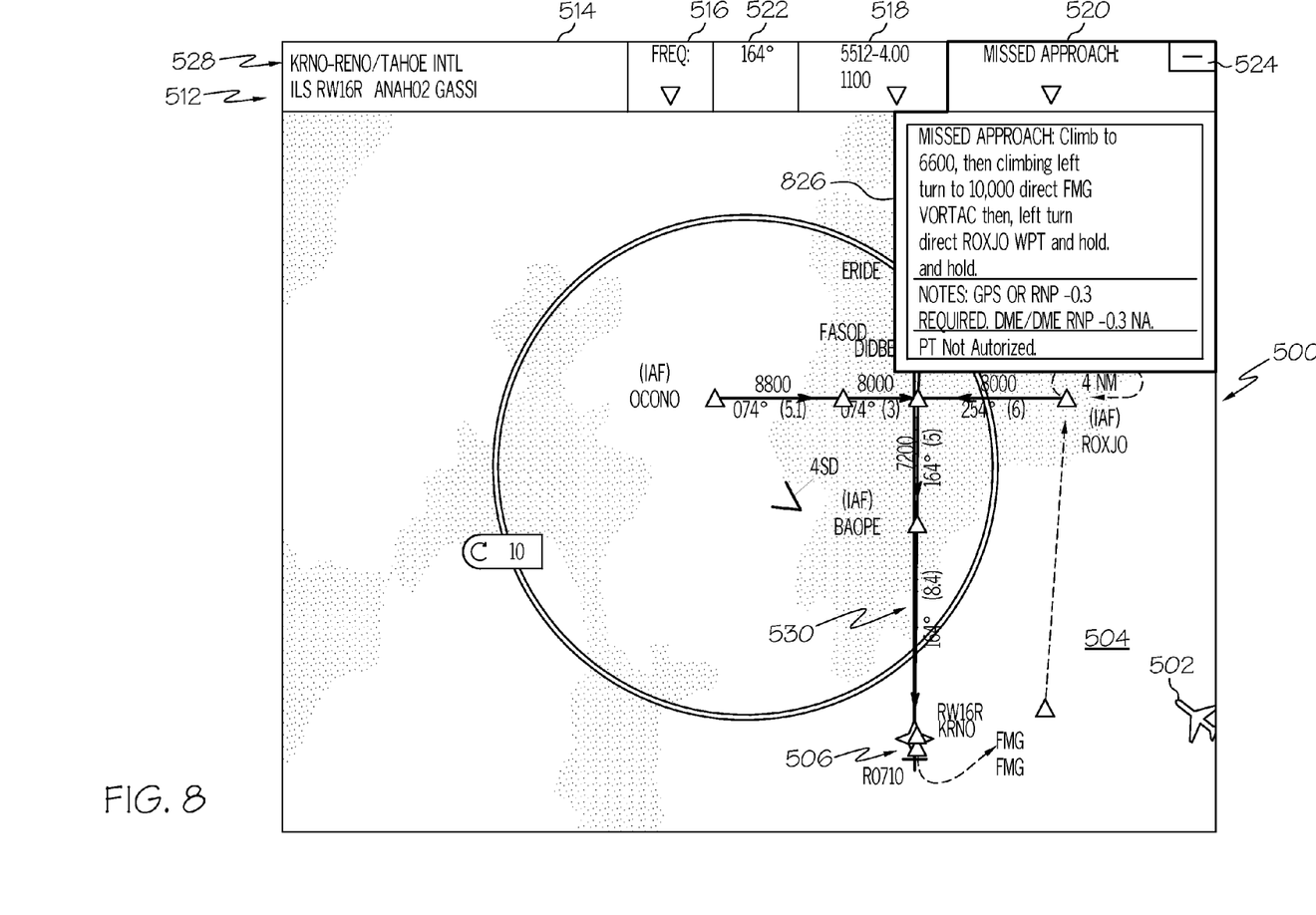
FIG. 8 is a schematic view of an exemplary navigational map suitable for use with the interactive briefing process of FIG. 4, showing display of a missed approach procedure overlying a portion of the navigational map in accordance with one embodiment.

As shown in FIG. 7, in accordance with one embodiment, the interactive briefing process 400 may be utilized to review and select the appropriate or desired minima criteria from a minima table for the identified approach. A user may manipulate the user interface 110 to identify the segment 518 displayed in the briefing panel 512 that corresponds to the minima criteria in a similar manner as described above. In response, the interactive briefing process 400 displays a pull-down menu comprising a minima table 726 for the identified approach 528. In this regard, the minima table 726 comprises the minimum altitude referenced to mean sea level (MSL), runway visual range, and minimum altitude above ground level (AGL) arranged by aircraft category (e.g., categories A, B, C, D, and E) and type of approach (e.g., lateral navigation (LNAV) approach, straight-in ILS (S-ILS), straight-in localizer (S-LOC), and circling). In this regard, the aircraft categories may be arranged as column headings horizontally across the top of the minima table 726 and the approach types arranged vertically along the side of the minima table 726. A user may select or identify the desired minima criteria 728 from the minima table 726, for example, the category B LNAV approach. In this regard, if the display system 100 is adapted for voice recognition, the user may select or identify the desired minima criteria 728 by speaking the desired row and column headings (e.g., by saying "LNAV CATEGORY B"). In response to identifying selection of the desired minima criteria 728, the interactive briefing process 400 may update the briefing panel 512 by displaying the identified minima criteria 728 in the corresponding segment 518 of the briefing panel 512. As shown in FIG. 8, in another embodiment, the interactive briefing process 400 may also be utilized to review missed approach information for an identified approach. A user may manipulate the user interface 110 to select the missed approach segment 520 displayed in the briefing panel 512 in a similar manner as described above. In response, the interactive briefing process 400 displays missed approach instructions 826 for the identified approach 528 on the display device overlying the map 500.

To briefly summarize, the methods and systems described above allow a user, such as a pilot or crew member, to identify a desired aircraft action for an identified airport and review the procedure information for the desired aircraft action (e.g., instrument approach procedures or instrument departure procedures) without having to rely on paper charts. A briefing panel or briefing strip is used to present instrument procedure information in an easy to understand manner thereby allowing a user to quickly and reliably be determine the appropriate instrument procedure information for subsequent operation of the aircraft. The briefing panel is arranged to overlie a navigational map or other displayed content in a manner that allows the user to maintain situational awareness while simultaneously reviewing the instrument procedure information.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It being understood that various changes may be made in the function and arrangement of elements described in an exemplary embodiment without departing from the scope of the subject matter as set forth in the appended claims.

What is claimed is:

1. A display system onboard an aircraft comprising a display device having rendered thereon a navigational map comprising:
   a graphical representation of terrain corresponding to a location of the aircraft; and
   a briefing panel overlying the graphical representation of the terrain, wherein the briefing panel includes a plurality of segments associated with procedure information for an aircraft action, wherein each segment of the plurality of segments is associated with a category of the procedure information and includes a value or criterion for that respective category of the procedure information for the aircraft action.

2. The display system of claim 1, wherein the briefing panel overlies a portion of the navigational map and includes a selectable segment associated with a first type of instrument approach procedure information, wherein the navigational map further comprises a menu overlying the graphical representation of the terrain, the menu being associated with the selectable segment.

3. The display system of claim 2, wherein the menu includes a plurality of possible approaches.

4. The display system of claim 2, wherein the menu includes a plurality of possible radio frequencies for the aircraft action.

5. The display system of claim 2, wherein the menu includes a minima table for the aircraft action.

6. The display system of claim 1, wherein the aircraft action comprises a first approach for an airport, wherein each segment of the plurality of segments is associated with a category of instrument approach procedure information for the first approach and includes a value or criterion for that respective category of the instrument approach procedure information for the first approach.

7. The display system of claim 1, wherein the aircraft action comprises a first departure route for an airport, wherein each segment of the plurality of segments is associated with a category of instrument departure procedure information for the first departure route and includes a value or criterion for that respective category of the instrument departure procedure information for the first departure route.

8. The display system of claim 1, wherein the procedure information is based on an operating characteristic of the aircraft.

9. The display system of claim 1, wherein the plurality of segments comprise a plurality of menu segments, each menu segment being associated with possible values or criteria for the respective category of procedure information associated therewith.

10. The display system of claim 1, wherein the procedure information comprises operating parameters or instructions associated with the aircraft action.

11. A display system onboard an aircraft comprising a display device having rendered thereon:
a navigational map; and
a plurality of menu segments overlying a portion of the navigational map, each menu segment being associated with possible values or criteria for a type of instrument procedure information for an airport and displaying an identified value or criterion of the possible values or criteria for the type of instrument procedure information associated therewith.

12. The display system of claim 11, wherein each menu segment contains the identified value or criterion of possible values or criteria for a type of instrument approach procedure information associated with the respective menu segment for a first instrument approach procedure associated with a first approach at the airport.

13. The display system of claim 11, further comprising a menu comprising a plurality of possible approaches for the airport displayed on the display device in response to selection of a first menu segment of the plurality of menu segments.

14. A display system onboard an aircraft, the display system comprising:
a display device; and
a system coupled to the display device to render, on the display device, a navigational map comprising:
a graphical representation of terrain corresponding to a location of the aircraft; and
a briefing panel including a plurality of segments associated with procedure information for an aircraft action, wherein each segment of the plurality of segments is associated with a category of the procedure information and includes a value or criterion for that respective category of the procedure information for the aircraft action.

15. The display system of claim 14, wherein:
the aircraft action comprises a first approach for an airport; and
each segment of the plurality of segments is associated with a category of instrument approach procedure information for the first approach and includes a value or criterion for that respective category of the instrument approach procedure information for the first approach.

16. The display system of claim 15, wherein the system is configured to identify the first approach based on a current heading of the aircraft.

17. The display system of claim 15, wherein the system is configured to identify the first approach based on the location of the aircraft.

18. The display system of claim 14, further comprising a user interface to select a first segment of the plurality of segments, wherein the system is coupled to the user interface to display, on the display device, a menu including a plurality of possible values or criteria for the category of procedure information associated with the first segment in response to identifying selection of the first segment.

19. The display system of claim 18, wherein the menu comprises a pull-down menu.

20. The display system of claim 14, wherein the system comprises a flight management system.

* * * * *